Figure 8:
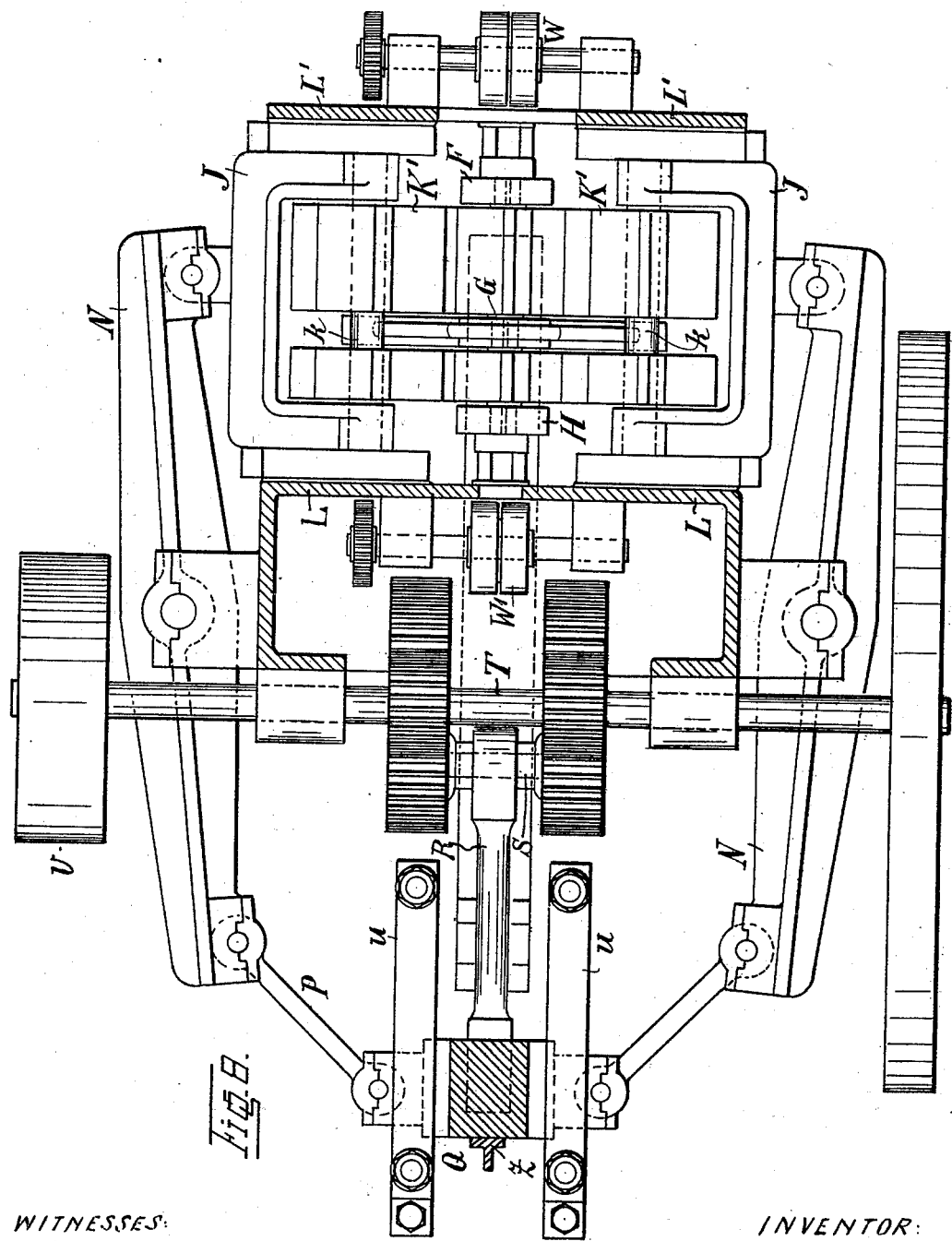

No. 671,038. Patented Apr. 2, 1901.
F. W. WESNER.
MACHINE FOR MANUFACTURING CHAINS FROM CROSS IRON.
(Application filed Oct. 25, 1899.)
(No Model.) 5 Sheets—Sheet 1.
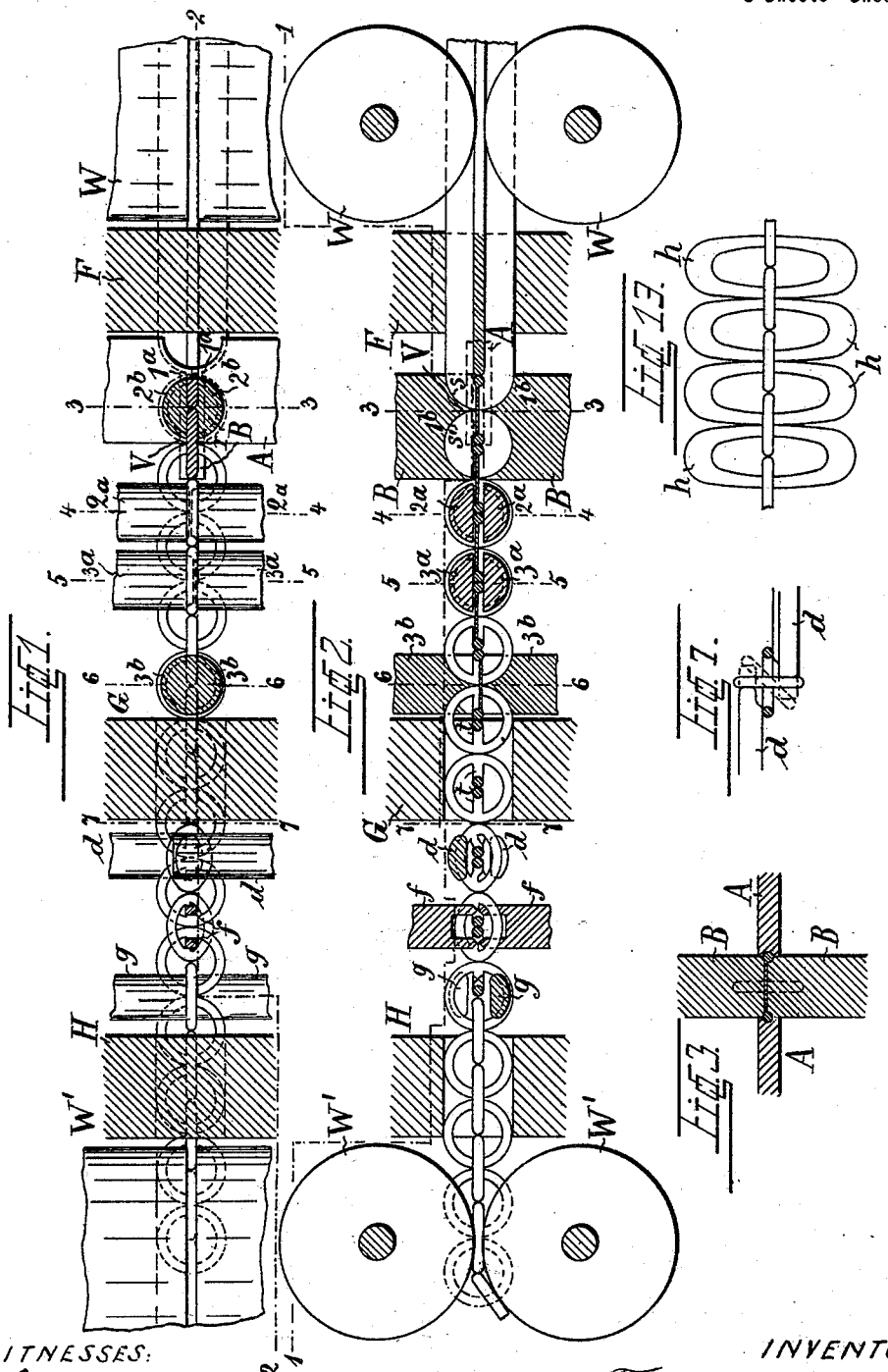
WITNESSES:
INVENTOR:
Friedrich Wilhelm Wesner,
By his Attorneys:

No. 671,038. Patented Apr. 2, 1901.
F. W. WESNER.
MACHINE FOR MANUFACTURING CHAINS FROM CROSS IRON.
(Application filed Oct. 25, 1899.)
(No Model.) 5 Sheets—Sheet 2.
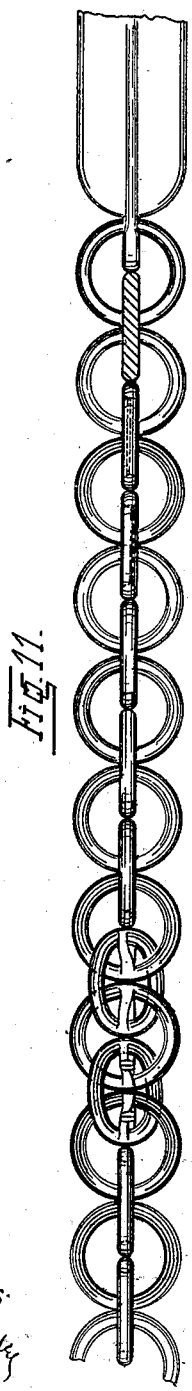
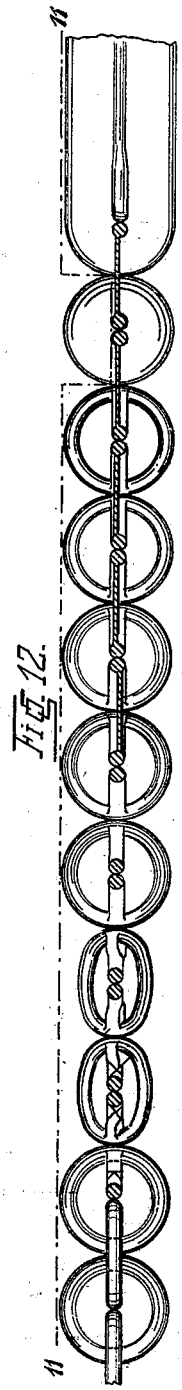
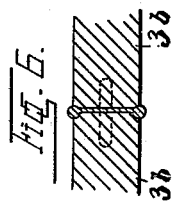
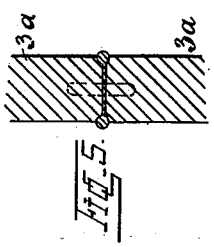
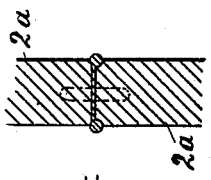
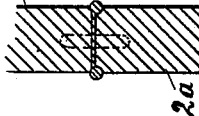
WITNESSES
INVENTOR
Friedrich Wilhelm Wesner
By his Attorneys No. 671,038. Patented Apr. 2, 1901.
F. W. WESNER.
MACHINE FOR MANUFACTURING CHAINS FROM CROSS IRON.
(Application filed Oct. 25, 1899.)
(No Model.) 5 Sheets—Sheet 3.

WITNESSES: INVENTOR:
Fred White Friedrich Wilhelm Wesner,
Rene Bruine By his Attorneys:

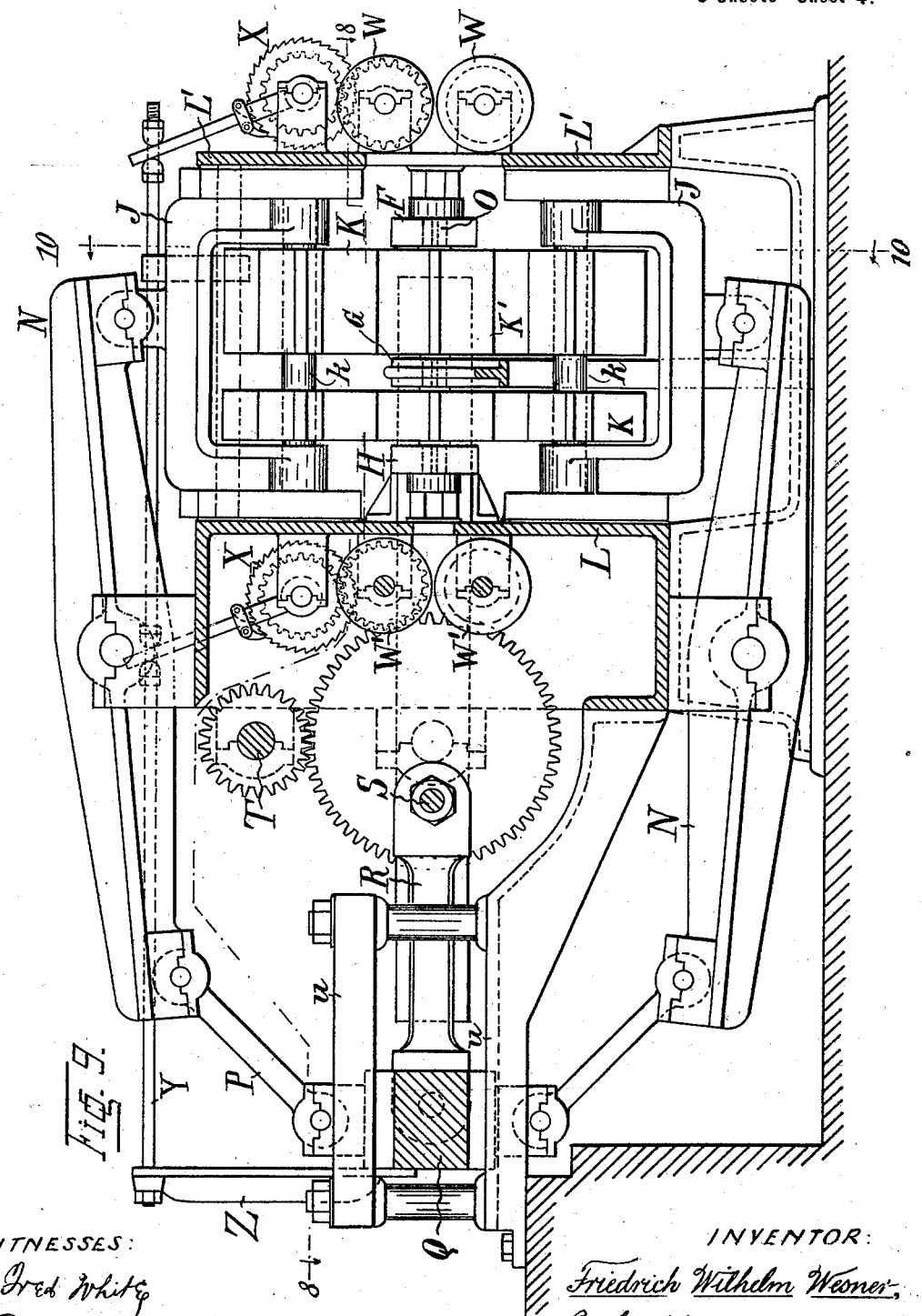

No. 671,038. Patented Apr. 2, 1901.
F. W. WESNER.
MACHINE FOR MANUFACTURING CHAINS FROM CROSS IRON.
(Application filed Oct. 25, 1899.)
(No Model.) 5 Sheets—Sheet 5.
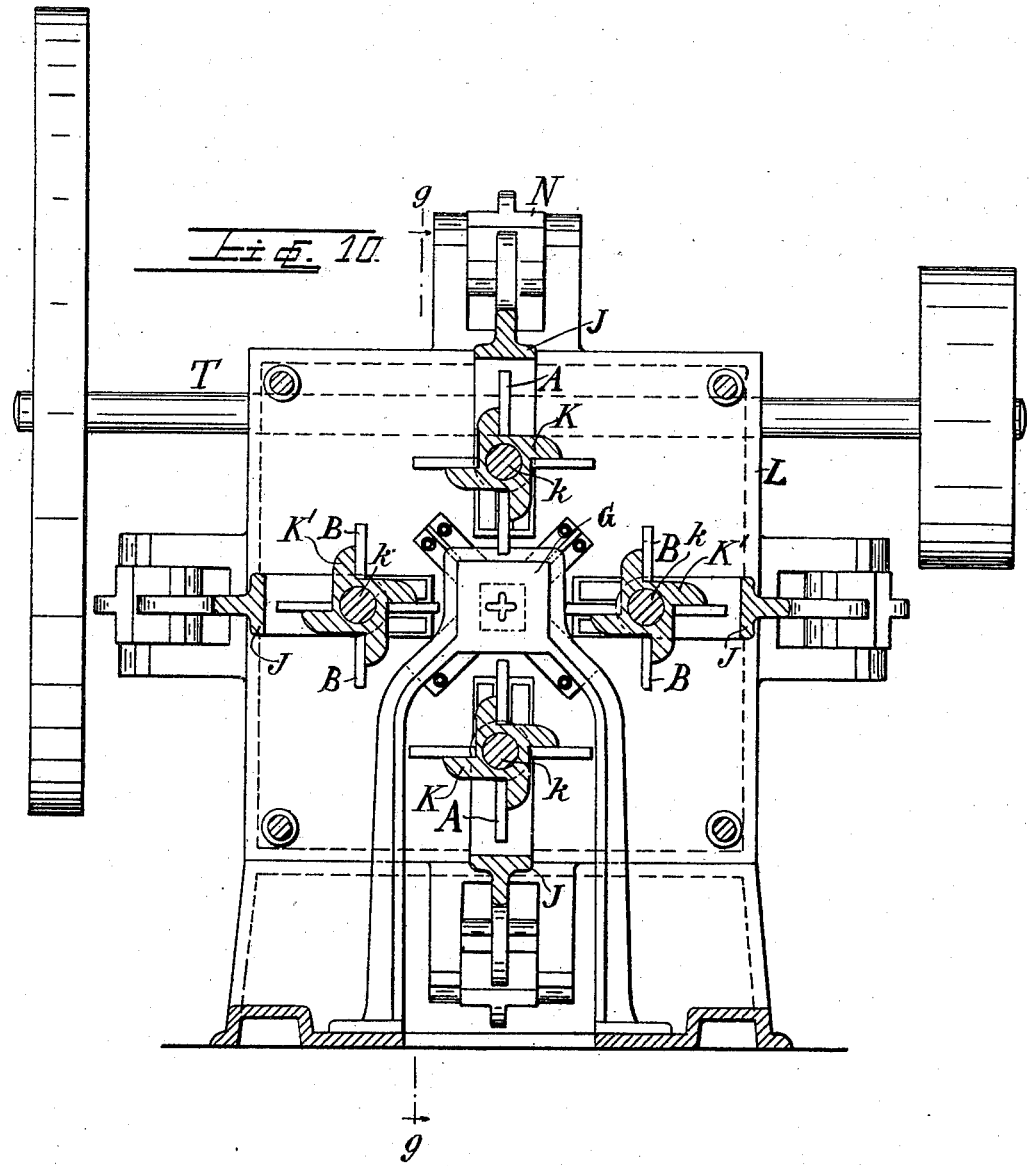
WITNESSES:
INVENTOR:
Friedrich Wilhelm Wesner,
By his Attorneys

UNITED STATES PATENT OFFICE.

FRIEDRICH WILHELM WESNER, OF CHARLOTTENBURG, GERMANY.

MACHINE FOR MANUFACTURING CHAINS FROM CROSS-IRON.

SPECIFICATION forming part of Letters Patent No. 671,038, dated April 2, 1901.

Application filed October 25, 1899. Serial No. 734,708. (No model.)

*To all whom it may concern:*

Be it known that I, FRIEDRICH WILHELM WESNER, a subject of the German Emperor, residing at Charlottenburg, in the German Empire, have invented certain new and useful Improvements in Machines for Manufacturing Chains from Cross-Iron; and I do hereby declare the following to be a full, clear, and exact description of the invention, such as will enable others skilled in the art to which it appertains to make and use the same.

This invention relates to the manufacture of chains from cross-iron or steel—that is, from bar-iron or steel bars having the section of a cross.

Attempts have been made before to manufacture complete chains from cross-iron, the links of which were without welding seams, in various ways, however not with such success that one of the known methods could be practically carried into effect. The deficiencies inherent to these known methods are of various kinds. The apparatus or plants that have been suggested for manufacturing chains of the said kind have been so exceedingly costly and complicated that the manufacture either turned out a failure altogether or the machines had to be repaired so soon and frequently that the production of the chains proved to be more costly than when they are made by hand. Also by certain methods it was not possible to turn the complete cross-iron bar into a chain, so that a large amount of the material had to be cast to the scrap, and, moreover, it was not possible to confine the successive operations to a short distance on the length of the bar, which is absolutely necessary in order to maintain the requisite heat given to the iron or steel a sufficient length of time until it has been completely turned into finished chain-links. It also proved extremely difficult to sever the different links from each other. The deficiencies are not present in my machine for manufacturing chains from cross-iron, which is exceedingly simple and can be built up with little cost. In this machine the operation is carried on on a very small part of the length of the cross-iron bar and during such short space of time that the manufacture of the chain proceeds very quickly. There are only very small bits that are thrown into the scrap, and the severing of the links from each other is carried on in my machine in the simplest manner, smoothly, and without difficulty. The cross-iron bar to be made into a chain is first heated to the necessary degree and then fed intermittingly between four dies reciprocating toward and away from each other at each time for such a length that two links may be formed at each stroke of the dies. When the links have attained the annular or oval shape, a small web of rectangular cross-section remaining integral with and between the links, the severing is brought about by twisting the links against each other, notching the said webs on two opposite sides, and twisting the links back again. Thereupon if the links are below a certain thickness the chain is once more heated and operated upon by such dies that by their action in pressing toward each other the chain attains its final shape, whereby the remaining parts of the webs are pressed into the flesh of the links. When the links are above a certain thickness, it is not necessary to heat the blank a second time for the last-named operation.

In the drawings, in which is shown a machine built according to my invention, similar characters refer to similar parts.

Figures 1 and 2 show diagrammatically the dies in two different longitudinal sections, Fig. 1 being drawn to the line 1 1 of Fig. 2 and Fig. 2 being drawn to the line 2 2 of Fig. 1. Figs. 3, 4, 5, 6, and 7 are cross-sections drawn to the lines 3 3, 4 4, 5 5, 6 6, and 7 7 of Figs. 1 and 2, respectively. Fig. 8 is a plan, and Fig. 9 an elevation, of a complete machine. Fig. 10 is an end view of the machine; and Figs. 11 and 12 are views of a cross-iron bar separate from the machine, showing the successive shapes of the link-blanks. Fig. 13 illustrates a modification of the chain.

As has been said above, the cross-iron is first heated in a suitable oven (not shown in the drawings) and fed intermittingly to the dies. This is done by means of two rolls W, in front of which there is a guide-block F, having an opening corresponding to the section of the cross-iron through which the cross-iron is fed along by means of the said rolls. After passing the guide-blocks F the cross-iron is simultaneously operated upon by four dies A and B in such manner that two dies A are moved in vertical direction and two dies B are moved in horizontal direction toward the cross-iron, whereupon all four dies again retire.

The two dies A are made up of a number of die-sections $1^a$, $2^a$, and $3^a$, and the dies B are made up of a number of sections $1^b$, $2^b$, and $3^b$.

In the first feeding movement the front end of the cross-iron arrives at the line 1, whereupon the dies A and B approach each other. The section $1^a$ of the horizontal dies A are pressed into the horizontal blades of the cross-iron and produce by their corresponding shape the outer rounding off of one link and the half of the next following link lying in the same plane. This rounding off of one and a half links in the same plane is only produced by the first operation of the dies on a new cross-iron bar. At every following operation after renewed feeding forward of the bar only a V-shaped impression is made by the correspondingly-shaped part V of the die-section $1^a$, while the named half rounding off produced by the preceding operation serves as a guide for the part $r$ of the die-section $1^a$. Together with the die-section $1^a$ also the vertical sections $1^b$ and $2^b$ operate on the cross-iron. The die $2^b$ is round or oval-shaped, according to the desired shape of link to be produced, and is hollowed at its outer edge to the shape of a quarter of a circle. This die-section presses at both sides of the vertical blade of the cross-iron into the horizontal blade, so as to make a semicircular solid iron piece, rounded off on the outside by the above-named die-section $1^a$, so that the material is pressed from the center to the outer rim and also the inner rounding off of the link-blank is attained. Between the sections $2^b$ a thin metal layer is left, since it is not possible to squeeze all the metal to a side, and therefore a thin sheet or partition-wall remains, which is punched out later on. It may be gathered from the above that nearly all the metal of the cross-iron blade is made use of to shape the link. Therefore the thickness of the cross-iron must be less than that of the chain to be produced. On the section $2^b$ there are on the under side depressions $s$ $s'$ of the shape of a quarter of a circle of a size corresponding to the thickness of the chain to be produced, which depressions are rounded off at the bottom and which meet at the center of the first-formed link and between which the V-shaped section $1^b$ is formed. This section $1^b$ in the operation of the complete die forces its way into the vertical blade of the cross-iron, and thus produces the front and hinder rounding off of two successive links. The dies after having acted in the above-said manner then retire, moving away from each other, and permit a renewed feed of the cross-iron bar for the length of a complete link. After each feed the dies operate in the same manner as above described on the next following part of the bar. After the first feed only the outer rounding off of the first vertical link is completed by means of the depression $s'$ of the die-sections $1^b$ $2^b$. The rounding off which is produced by the depression $s'$ at the first operation of the dies need not be considered, since this round part is finally allowed to go into the scrap, it being merely a half of a link. After the next feeding operation the first vertical link-blank being now completely rounded off on the outside arrives between the die-sections $2^a$, which create the semicircular impressions and the inner rounding off. The die-sections $2^a$, like the previously-named sections $2^b$, are so formed that the thin metal plate left between them does not lie exactly in the central plane, but advantageously to one side of such plane and parallel therewith. For this purpose the right-hand die-section $2^a$ is somewhat shorter than the left-hand die-section. The next following operation is accomplished by the die-section $3^a$, which is shaped in the same manner as the die-section $2^a$, with the exception that now the left-hand die-section is the longer one. By these means the metal plate is pushed beyond the central plane, and thus punched off. This being done, the horizontal link formed first arrives at the next following operation between the vertical die-sections $3^b$, which only differ from the sections $2^b$ inasmuch as the upper sections are somewhat longer, while speaking of the sections $2^b$ the under section is longer than the upper one. By these means also the metal plates formed in the horizontal link-blanks are punched out. After passing the die-sections $3^b$ the links only adhere by the webs $t$, upon which the above-described vertical and horizontal die-section can have no effect, thus being unable to get at them. These webs are cut or broken at their center by twisting the links against each other in one direction, making notches into the webs and twisting the links back again, as hereinafter described. In order to give the links the necessary support while performing this operation, fixed guide-blocks G and H are mounted in front of the sections $3^b$, which guide-blocks are arranged for a distance apart from one another equal to the length of three links. When the first vertical link has passed the guide-block G, the horizontal die-section $d$ gives the same a twist or a partial rotation about its longitudinal center line, the upper section $d$ pushing the upper part of the link to one side and the other section $d$ pushing the lower part of the link to the other side. This enables the vertical movable blunt cutters or nippers $f$ to act upon the webs $t$ after the next feed being carried on, whereby a sharp indentation or notch is made into the web $t$ from two opposite sides. The sections $g$ are shaped similar to the sections $d$. However, they are somewhat shorter and arranged inversely as to the height. By these sections $g$ the link is twisted into its normal position, whereby it is severed from the two neighboring links. In front of the guide-block H another pair of feed or drawing rolls W' are mounted, which serve to carry on the chain. Should the severing not be fully accomplished by the described means when the iron or steel is particularly tough, special means may be designed to complete such severing—as, for instance, an impact device arranged in front of the guide-block H for pushing the links as they project from the guide-block successively to one side, and thus breaking them off. When leaving the rolls W', the chain may be drawn through another oven, (not shown in the drawings, since any suitable oven may be employed,) so as to again heat the chain to red heat. This reheating, however, will not be necessary for thick chains. The chain must leave the second oven in vertical position, and it enters between other dies, which are arranged so as to act upon the chains from four sides instead of from below—that is to say, a machine, as shown in Figs. 8, 9, and 10, is used vertically instead of horizontally, as shown. By a machine thus arranged the remaining parts of the webs t are battered or pressed down into the flesh of the links, which also attain their final shape.

If it is desired to make chains having long oval links, the breadth of the cross-iron is advantageously chosen so as to produce by dies similar to those shown in Figs. 1 and 2 oval links, the long sides of which are at right angles to the center line of the bar. Thereby the advantage is attained that after passing the feed-rolls W' or the second oven, if such a one is employed, the links by means of their own weight are turned so as to hang down longitudinally, thus allowing the remaining parts of the webs to be situated at the center between the ends of the neighboring links. When the links are annular, the remaining parts of the webs also slide against one another, owing to their wedge-like shape, so that they are side by side. However, it may happen that at the place where the second vertically-arranged machine, Figs. 8 and 9, has operated upon them, the inner rounding off is not so highly finished. The links are annular at the first stages of operation only in such case when the links of the finished chain are short—that is to say, when the length of the same does not surpass three times the thickness of the iron.

The dies A and B after every contact with the red-hot iron are cooled by dipping into or sprinkling with water or moistened by means of wet cloths. The shafts k, on which the die-carriers are mounted, are journaled in yokes J, which are suitably guided on standards L L'. The yokes J are pivoted to the ends of levers N, which near their center are fulcrumed to the framing of the machine, and with their other ends are connected by means of links P to cross-head Q, guided between four horizontal guides u. The cross-head Q is reciprocated by means of a crank-shaft S, connected to the cross-head Q by a rod R and driven by a suitable gearing rotated from the driving-shaft T. The latter may be provided with a fly-wheel and carries a pulley U, driven by a belt or otherwise from any supply of force. The rotation of the crank-shaft produces a reciprocating motion of the cross-head, which sets the four levers N to oscillate about their fulcrums, thus forcing the die-carriers K and K' toward and away from each other. When the dies retract from one another, the cross-iron bar or the newly-formed chain is fed forward. For this purpose the rolls W and W' are provided with ratchet mechanisms X, which are operated by the push-rod Y. This push-rod is guided in a suitable manner on the framing and is attached to the cross-head Q by an arm Z.

The described mechanism for operating the cross-head is especially adapted when chains of minor thickness are to be made. In machines in which heavy chains are to be manufactured the cross-head may be attached directly to the piston-rod of a steam-engine.

As has been said before, the machine for operating on the chain after it has passed the second oven is built in the same manner as described with reference to Figs. 8 and 9, with the difference that the dies move in horizontal planes instead of in a vertical plane and the cross-head moves in a vertical direction instead of in a horizontal direction—that is to say, it is the same machine arranged vertically—of course the dies being shaped according to the work to be performed.

Each die-carrier may be arranged in both machines with a more or less number of dies instead of with four, as shown.

Having now particularly described my invention, what I claim as new therein, and desire to secure by Letters Patent, is—

1. A machine for manufacturing chains from a metal bar, comprising dies for forming the link-blanks, dies for punching the webs left in such blanks, means for tilting the successive links, means for cutting the intervening attaching portions, and means for operating such mechanisms.

2. A machine for manufacturing chains from a metal bar, comprising dies for forming the link-blanks, dies for punching the webs left in such blanks, means for tilting the successive links, means for cutting the intervening attaching portions, and means for supporting the links during such tilting and cutting operations.

3. A machine for manufacturing chains from a metal bar comprising dies for forming the link-blanks, dies for punching the webs left in such blanks, means for tilting the successive links, means for notching the intervening attaching portions, means for again tilting the links to break apart such notched attaching portions, and means for operating said several mechanisms.

4. A machine for manufacturing chains from a metal bar, comprising dies for forming the link-blanks, dies for punching the webs left in such blanks, means for tilting the successive links in one direction, means for tilting said successive links in the opposite direction, and means for operating said dies and tilting mechanism.

5. A machine for manufacturing chains from metal bars, comprising dies for forming the link-blanks, adapted to form an interior web in a plane to one side of the middle of each link, dies for forcing said web toward the opposite side of the link to punch out said web, and means for actuating said dies to operate successively upon each link.

6. A machine for manufacturing chains from cross-metal bars, comprising dies for forming the outer portions of the links, dies for forming the inner portions of the links, dies for punching out the interior webs, means for tilting each link successively, means for cutting the intervening attaching portions, means for operating said mechanisms, and means for intermittently feeding the bar.

7. A machine for manufacturing chains from cross-metal bars, comprising dies for forming the outer portions of the vertical links, dies for forming the outer portions of the horizontal links and simultaneously forming the inner portions of the vertical links leaving them with an interior web, dies for forming the inner portions of the horizontal links, and leaving them with interior webs, means for punching out such webs from each of the links, means for separating the links, and means for actuating said several mechanisms.

8. A machine for manufacturing chains from cross-metal bars, comprising dies for forming the link-blanks, dies for punching out the webs left in such blanks, and means for tilting the successive links, consisting of two sections engaging the opposite sides of a link, and moving in opposite directions.

9. In machines for manufacturing chains from cross-metal bars, the combination with dies for forming the link=blanks, dies for punching out the interior webs, and means for tilting the links, of two punches adapted to move toward each other to notch the intervening attaching portions of the links.

10. In machines for manufacturing chains, the combination of the dies A and B, dies for punching the interior webs, means for tilting the links, and means for separating such tilted links.

11. A machine for manufacturing chains, comprising the dies A and B for forming the links, the sections $d$ for tilting the links, and the punches $f$ for cutting the intervening attaching portions.

12. A machine for manufacturing chains, comprising the dies A and B for forming the links, the sections $d$ for tilting the links, the punches $f$ for cutting the intervening attaching portions, the sections $g$ for oppositely tilting the links, means for operating said several mechanisms, and means for intermittently feeding the bar.

In testimony whereof I affix my signature in presence of two witnesses.

FRIEDRICH WILHELM WESNER.

Witnesses:
WOLDEMAR HAUPT,
HENRY HASPER.